(12) United States Patent
Han et al.

(10) Patent No.: US 7,407,101 B2
(45) Date of Patent: Aug. 5, 2008

(54) CARD WITH ENHANCED SECURITY FEATURES

(76) Inventors: Wenyu Han, 503 Marten Rd., Princeton, NJ (US) 08540; Victor Zazzu, 22 Monroe Ave., Belle Mead, NJ (US) 08502

( * ) Notice: Subject to any disclaimer, the term of this patent is extended or adjusted under 35 U.S.C. 154(b) by 445 days.

(21) Appl. No.: 10/916,206

(22) Filed: Aug. 11, 2004

(65) Prior Publication Data

US 2005/0006481 A1    Jan. 13, 2005

Related U.S. Application Data

(63) Continuation-in-part of application No. 10/320,239, filed on Dec. 16, 2002, now abandoned, and a continuation-in-part of application No. 09/190,760, filed on Nov. 12, 1998, now Pat. No. 6,193,156.

(51) Int. Cl.
*G06K 7/10* (2006.01)
(52) U.S. Cl. .................... 235/457; 235/494
(58) Field of Classification Search ................ 235/494, 235/492, 493, 457
See application file for complete search history.

(56) References Cited

U.S. PATENT DOCUMENTS 4,013,894 A * 3/1977 Foote et al. ................. 250/569
4,945,215 A * 7/1990 Fukushima et al. ......... 235/457
5,432,329 A * 7/1995 Colgate et al. .............. 235/487
5,447,335 A * 9/1995 Haslop ........................ 283/91
5,605,738 A * 2/1997 McGinness et al. ...... 428/195.1
6,082,778 A * 7/2000 Solmsdorf ................... 283/82
6,328,209 B1 * 12/2001 O'Boyle .................... 235/380

* cited by examiner

*Primary Examiner*—Daniel Stcyr
(74) *Attorney, Agent, or Firm*—Henry I. Schanzer

(57) ABSTRACT

A card embodying the invention includes marks which are randomly formed within a dedicated region of the surface of the card. The randomly formed marks may, for example, include; (a) partial-holes extending a short distance from a surface of the card; (b) through-holes extending between the top and bottom surfaces of the card; (c) burn marks, or (d) ink marks. The marks are of a size and nature such that they are not readily visible to the naked eye. The invention includes illumination apparatus for illuminating the card to reliably sense the optical pattern of the randomly formed marks. In accordance with one aspect of the invention, a reader/writer includes apparatus for generating an array of light to uniformly illuminate the back surface of the card so as to pass light through the through-holes or through the partial holes. In accordance with another aspect of the invention, a reader/writer includes a light source for illuminating the front surface of the card containing the randomly formed marks and projecting the light onto the dedicated region of the card at an acute angle and sensing apparatus for capturing the light signals reflected from the random marks while ignoring the light reflected from the portion of the card not containing a mark.

32 Claims, 12 Drawing Sheets

CARD WITH ENHANCED SECURITY FEATURES

CROSS REFERENCES TO RELATED APPLICATIONS

This application is a continuation-in-part of U.S. patent application Ser. No. 09/190,760 filed on Nov. 12, 1998, now U.S. Pat. No. 6,193,156 and a partial divisional of the material disclosed therein. It is also a continuation in part of U.S. patent application Ser. No. 10/320,239 filed Dec. 16, 2002, now abandoned and titled Cards with Enhanced Security Features and Associated Apparatus and Methods.

BACKGROUND OF THE INVENTION

This invention relates to valuable cards, instruments and documents and, in particular to methods and apparatus for patterning or encoding these cards, instruments and documents.

For ease of discussion, the invention will be illustrated using cards such as commonly used plastic cards. However, it should be understood that in the specification to follow and in the appended claims, when reference is made to "cards", instruments and documents are also included, although not specifically identified as such.

Cards of interest may be used, for example, to identify a person or object and/or they may be used as a value card (i.e. a debit card or credit card) to withdraw money from a machine. Because of the value of these cards there are counterfeiters who make "false" cards which attempt to imitate "true" or "valid" cards. To enhance the security of the cards it is known to add additional security "feature" to the surface of the cards. These added security features can take the form of a hologram or a spatial dependent optical image or ghost images strategically placed on the surface of the card.

In a certain group of applications the security features are dependent on a person actually checking that the cards' security features are present and/or intact. A problem exists with these applications in that there are many instances where the person responsible for checking the validity of the card, such as a cashier, does not actually look at the credit card and simply mechanically "swipes" the card through a card reader, such as a slot reader. When this occurs, the security features present on the card such as the hologram on the surface of the card and the signature on the back of the card are rendered useless.

It is therefore desirable and/or necessary to develop a more reliable and automatic means for impeding the falsification of a card and to check whether these means are present. To this end, card readers may be used to automatically read or sense the security related information contained on a card to identify whether a card is valid. Also, to increase the security of the cards more features may be added to make it much more difficult to counterfeit these cards. Examples of means for enhancing the security of cards and for sensing (reading) the presence of the enhanced security means are described, for example, in our presently pending patent applications, identified below, the teachings of which are incorporated herein by reference: (a) Multi Sensor Information Reader filed on Apr. 7, 1998 and bearing Ser. No. 09/843,224, now U.S. Pat. No. 6,616,043 and (b) Method And Apparatus For Impeding The Counterfeiting Of Cards, Instruments And Documents filed May 26, 1998 and bearing Ser. No. 09/084,844 now U.S. Pat. No. 6,068,301.

SUMMARY OF THE INVENTION

A card embodying the invention includes marks which are randomly formed within a dedicated region of the surface of the card. The dedicated region of the card may, but need not, include the area of the card on which is deposited a hologram or a metal strip or any substance providing a highly reflective surface. The randomly formed marks may, for example, include; (a) partial-holes extending a short distance from a surface of the card, and/or through the hologram or metal plate; (b) through-holes extending between the top and bottom surfaces of the card; (c) burn marks, or (d) ink marks. The marks typically range in size from less than 25 microns to less than 100 microns in diameter (or width and length) so they are not readily visible to the naked eye. The random pattern is read/sensed by a reader/writer and information corresponding thereto is then either encoded in a storage element located on the card, in accordance with one embodiment of the invention, or stored in a remote data base, in accordance with another aspect of the invention. After the unique pattern is read and stored the card may be issued to a customer (user).

In accordance with one aspect of the invention, a reader/writer includes means for generating an array of light to uniformly illuminate a surface of the card so as to pass light through the through-holes or through the partial holes when the card is made of a translucent material.

In accordance with another aspect of the invention, a reader/writer includes a light source for illuminating the surface (e.g., the front surface) of the card containing the randomly formed marks and projecting the light onto the dedication region of the card at an acute angle and sensing means for capturing the light signals reflected from the random marks while ignoring the light reflected from the portion of the card not containing a mark.

To be able to use the card, the user must insert the card in a reader which will authenticate (validate) the card by reading or sensing the random pattern and concurrently accessing the previously stored data pertaining to the random pattern.

BRIEF DESCRIPTION OF THE DRAWING

In the accompanying drawing like reference characters denote like components.

DETAILED DESCRIPTION OF THE INVENTION

Manufacture of Secure/Unique Card and Encoding the Card

Note: The term "card" as used herein and in the appended claims may be, or refer to, a credit (plastic) card or an instrument, such as a passport or a driver's license or any like document.

Figure 1A:
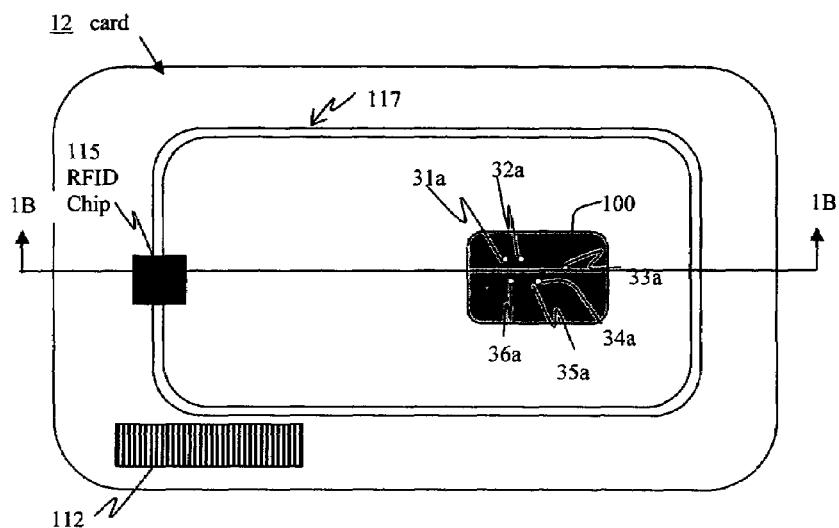
FIG. 1A is a not-to-scale top view of a card formed in accordance with the invention.
Figure 1B:
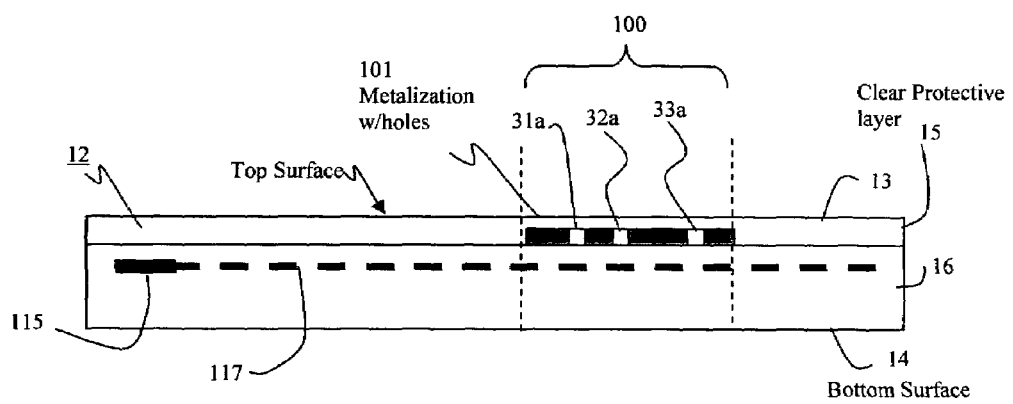
FIG. 1B is a not-to-scale cross-sectional view of a card formed in accordance with the invention.

1—Referring to FIGS. 1A and 1B, a card 12 embodying the invention includes a first surface 13, arbitrarily defined as the top or front surface, and a second surface 14, arbitrarily defined as the bottom or back surface. In FIGS. 1A and 1B, the top surface of the card includes a region 100 which may be a dedicated area in which "random" marks 31a through 36a are formed randomly. The region 100 is typically less than 20% of the surface area of the card. The region 100 also may be an area in which a hologram is disposed or an area on which is formed, or placed, a metallized strip providing a reflective surface. As describe below, a random pattern formed within region 100 may be used to authenticate or validate the card.

A card 12 embodying the invention includes marks formed randomly within the region 100 for creating a random pattern which tends to make each card different from any other card and extremely difficult to duplicate. The random pattern may be formed in a predetermined, dedicated, area on the card to enable a reader to easily locate and read the area containing the pattern to be read. The predetermined area identified as region 100 may include the location of a hologram or a metallized strip 101, as shown in FIG. 1B.

In FIGS. 1A and 1B the card 12 includes a region 100 in which is disposed a metallized strip 101, which may be part of a hologram, with holes 31a-36a randomly formed in the area 100 defining a random pattern.

Figures 5A, 5B, 5C:
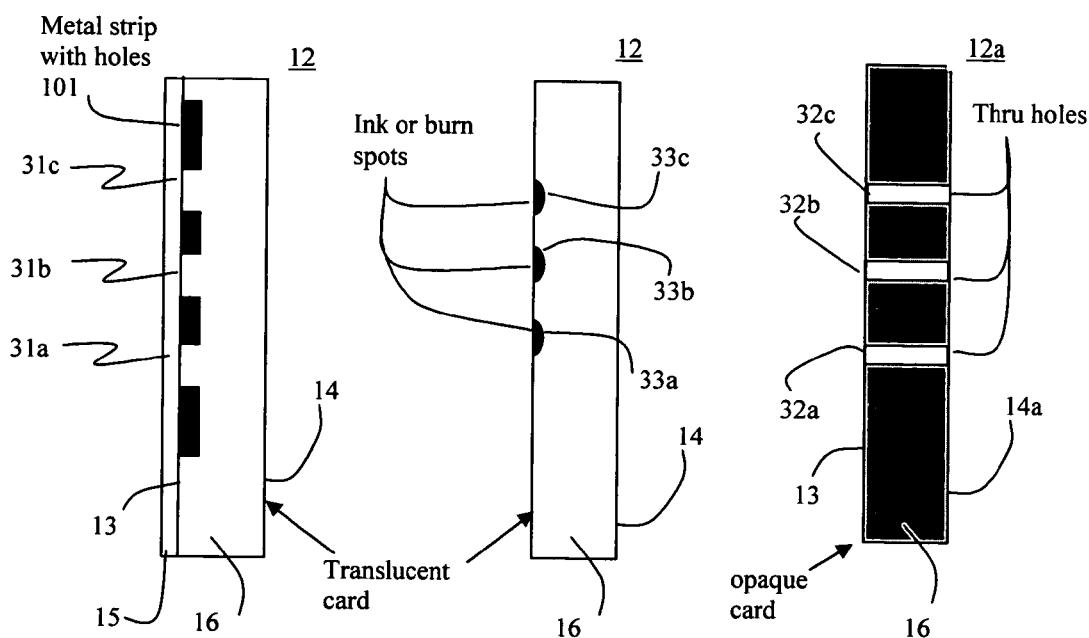
FIGS. 5A, 5B and 5C illustrate different types of random patterns formed on cards in accordance with the invention.

The random pattern may be formed in many different ways to produce many different types of patterns, as illustrated in FIGS. 5A, 5B and 5C.

(a) In FIGS. 5A and 1B randomly formed "partial"-holes extend for a short distance from one of the top and bottom surfaces. In FIGS. 1B and 5A a metallized strip 101 is formed on top of a card substrate 16 made of a translucent material. Holes 31a-36a are "randomly" formed in the strip 101 and a protective layer 15 is formed above the substrate and the metallization strip. The top of the protective layer 15 defines the top surface 13 of the card. It should be evident that, alternatively, the partial-holes may be formed on the bottom surface 14 of the card.

Figure 1C:
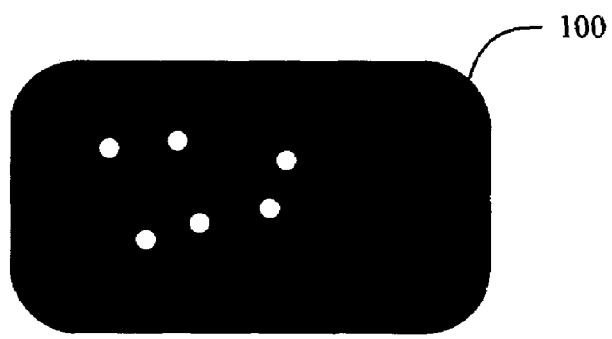
FIG. 1C shows a pattern of white dots on a black background obtained when holes (marks) are formed within a hologram or highly reflective surface.
Figure 1D:
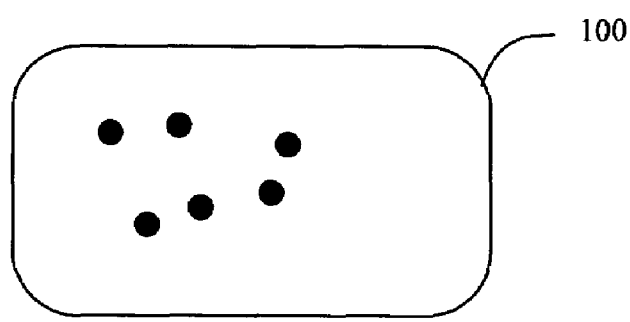
FIG. 1D shows a pattern of black dots on a white background obtained when holes (marks) are formed on a white card.
Figure 1E:
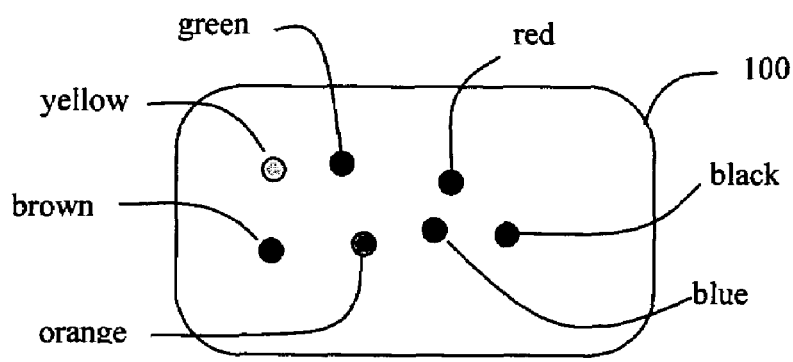
FIG. 1E illustrates a pattern generated when ink marks of different color are affixed on a card.

(b) In FIG. 5B there is shown marks (33a, 33b, 33c) formed by randomly affixing ink spots or burn spots (indentations or marks) on one surface (e.g., the top surface) of the card 12. The burn spots may be generated by use of a laser or a chemical etch. The ink spots as illustrated in FIG. 1E may be of different colors to provide an additional degree of security, as discussed below. The substrate 16 of card 12 in FIG. 5B is translucent.

(c) In FIG. 5C there is shown randomly formed thru-holes (32a, 32b, 32c) which extend all the way between the top, 13, and bottom, 14, surfaces of the card 12a. In FIG. 5C, the substrate 16 of card 12a is opaque.

It should be appreciated that the randomly placed marks formed on a card may have random shapes, so long as, when illuminated, either form the front or the back, the marks produce a recognizable, albeit random, pattern.

2—As shown in FIG. 1A, a card 12 may also have a fixed or pseudo-random optical pattern 112 to indicate, for example, information such as the source of the card or the identity of its manufacturer or issuer. The pattern 112 may also include information such as a serial number assigned to the card which would make the card unique (but not random). A card embodying the invention may also include personal information pertaining to the customer to whom the card is issued.

3—Cards embodying the invention, are manufactured to have or include a data storage element 115. The data storage element may be electronic and/or magnetic. For example, the data storage may be a semiconductor memory (ROM or RAM) with the capability of communicating to an off-the-card apparatus via contact or radio (contact-less communication). FIGS. 1A and 1B show an antenna 117, formed on and/or within the card 12, which is coupled to storage element 115, which may be an RFID chip or any other suitable element, for enabling information to be transmitted or received via radio frequency signals from or to the chip 115.

4—In systems embodying the invention, the random pattern (and any other pattern) formed on the card is read/sensed/detected by a novel reader/writer 10 designed for that purpose and information corresponding to the random pattern is encoded in the data storage element. Each card is thus made to include a random pattern—which is extremely difficult if not impossible to replicate, and information corresponding to the random pattern is stored in the data storage element.

Figure 8:
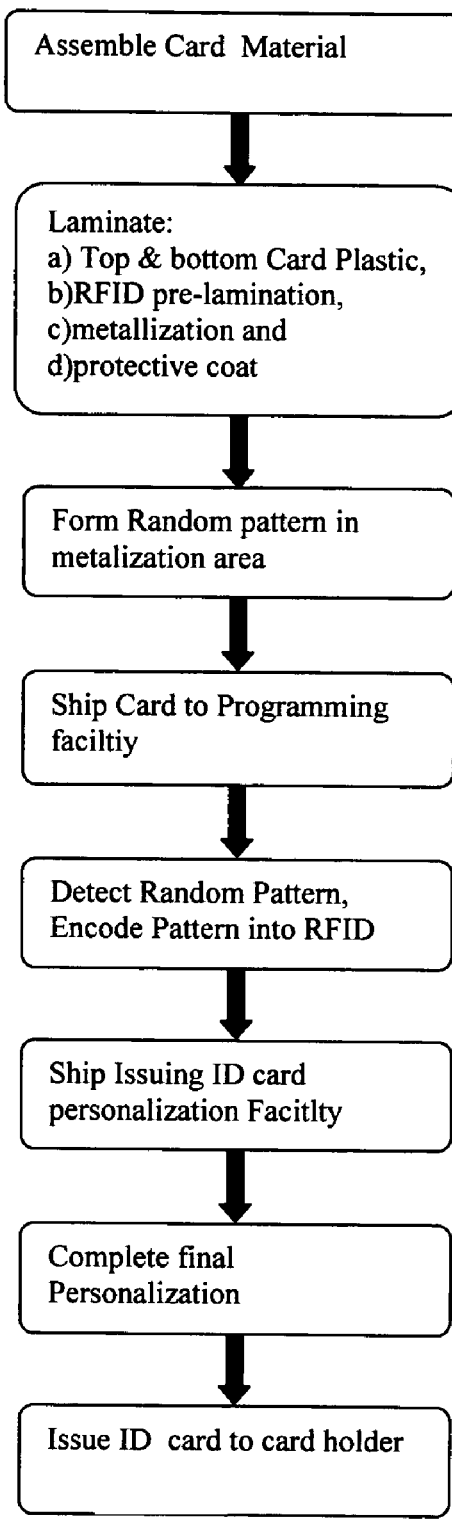
FIG. 8 is a chart illustrating process steps for forming and issuing cards embodying the invention.

A card manufacturer or an entity for which the card is manufactured will normally issue the card with the random pattern already encoded in the data storage element to an end user. A sequence of steps to form cards embodying the invention is shown in FIG. 8. In systems embodying the invention, for the end user to use the card, the card must be authenticated by a reader designed to read the patterns on the card and the information encoded on the card.

Note that a card with a security code embodying the invention (i.e., the random pattern) can be formed using relatively inexpensive and imprecise equipment. However, any one trying to replicate the card with the random pattern (i.e., the security code) would have to use extremely expensive equipment in order to try to reproduce the random holes and marks in the "secure" card.

Figure 2:
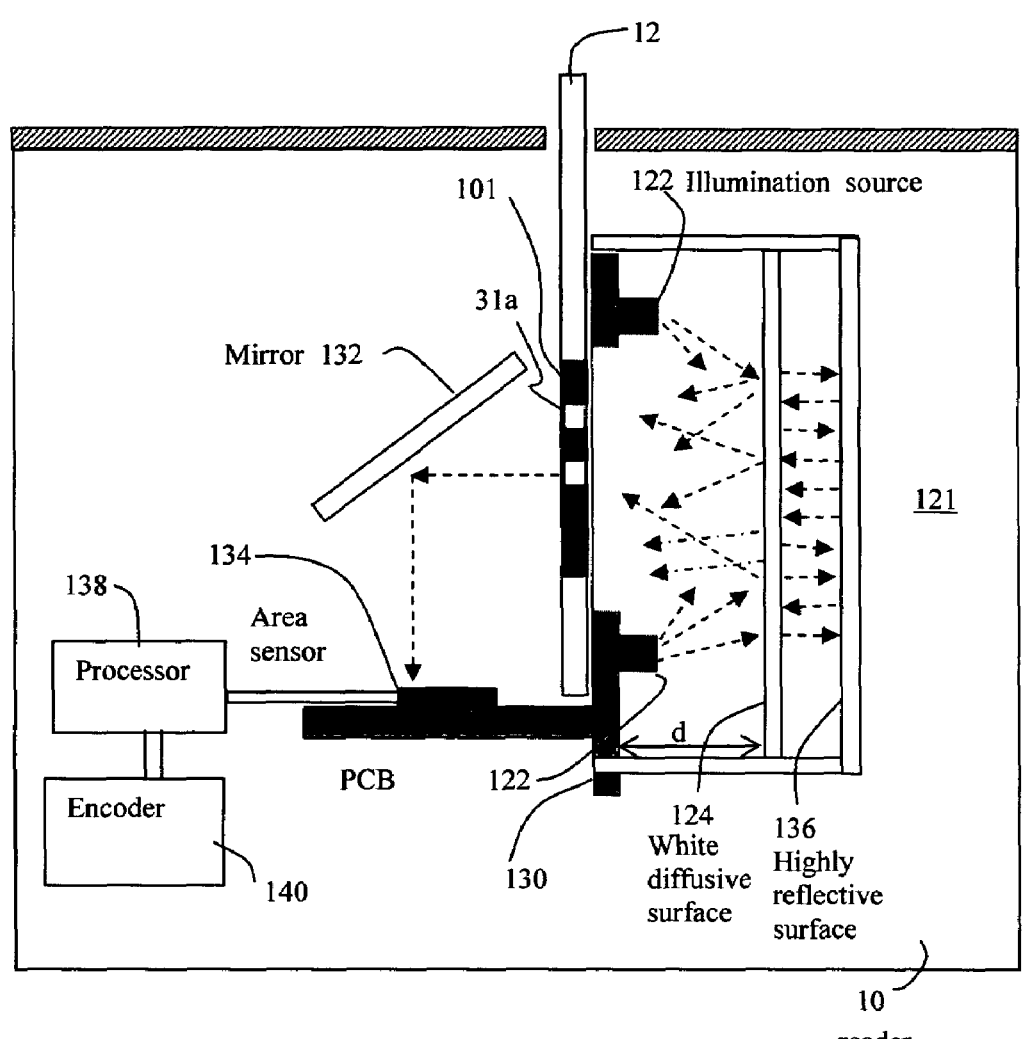
FIG. 2 is a highly simplified cut away view of a reader/writer embodying the invention and which may be used with cards embodying the invention.
Figures 3A, 3B:
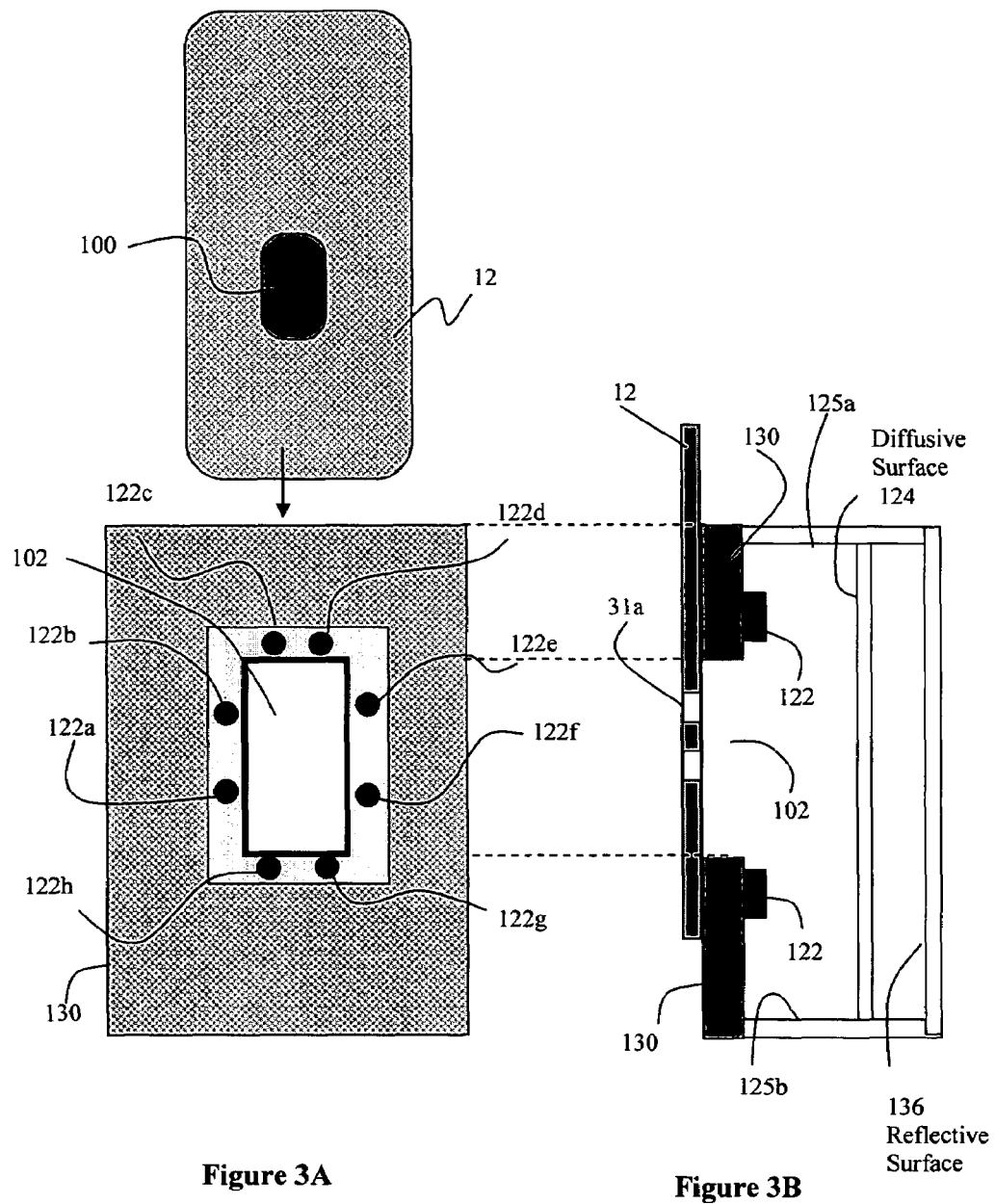
FIGS. 3A and 3B illustrate a back view and a cross-sectional view, respectively, of an inventive light enclosure which may be used to uniformly illuminate cards embodying the invention.
Figure 3C:
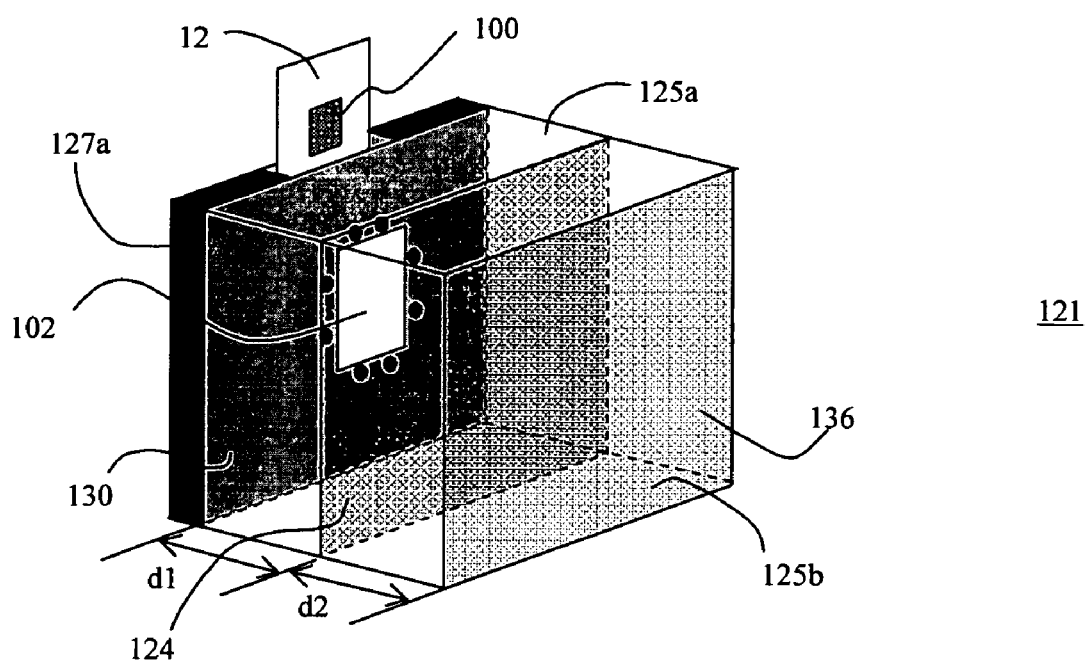
FIG. 3C is an isometric drawing of a light enclosure embodying the invention.
Figure 4:
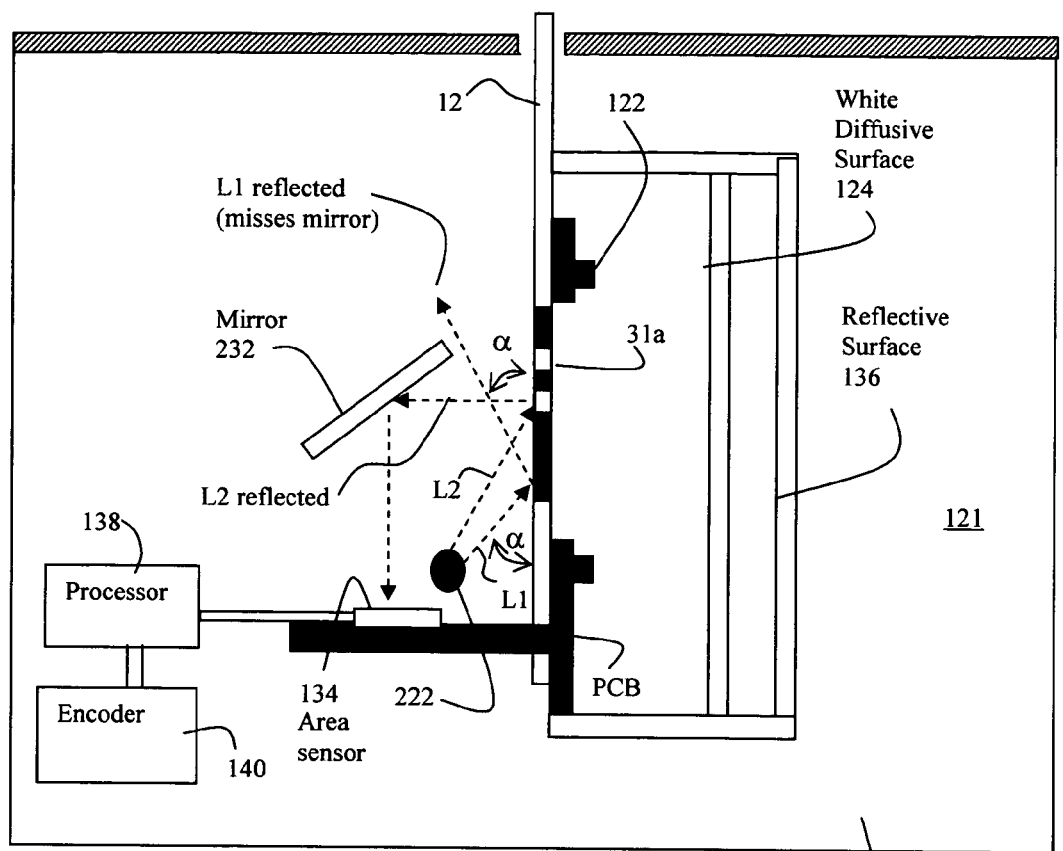
FIG. 4 is a highly simplified diagram of a "front-light" reader/writer embodying an aspect of the invention which may be used with cards embodying the invention.

Design features of a reader for sensing the improved security features formed on the card and authenticating the card are shown in FIGS. 2, 3A, 3B, 3C and 4. These figures also show two different modes of reading cards embodying the invention. FIGS. 2, 3A, 3B and 3C show the use of "back lighting" the card 12 to sense presence of holes on card. FIG. 4 illustrates the use of "front lighting" the card 12 to sense the random pattern (and possibly other patterns) present on or within the card, as further discussed below.

Referring back to FIGS. 2, 3A, 3B and 3C, there is shown novel apparatus for providing uniform illumination to the back surface of the card, in a direction generally perpendicular to the card 12. A card 12 may be inserted into a slot of a reader 10. The reader includes a light enclosure 121 shaped like a rectangular box comprising a first (or front) panel 130, a second (or middle) panel 124 and a third or back panel 136.

These panels may also be referred to as plates or walls, each having a front surface and a back surface. Panels 130, 124 and 136 are maintained parallel to each other by means of top and bottom plates 125a and 125b and side walls (not shown) located perpendicular to the panels in the vertical direction. The distance d1 between panels 130 and 124 may range, typically, from 1 to 10 millimeters, while the distance d2 between panels 124 and 136 may range, typically, from less than 1 millimeter to 3-4 millimeters.

The back or bottom surface of card 12 is intended to be placed against the front surface of panel 130. The front panel 130 has a window 102 cut out or formed in an area corresponding to region 100 of card 12, when the card is inserted in the reader. That is, region 100 of card 12 is intended to be opposite window 102 when the card is inserted in the reader. Light sources 122 are mounted on the back surface of panel 130 and around the perimeter (periphery) of the window. Light sources 122, which may be standard light emitting diodes (LEDs), are mounted to illuminate a white diffusive and reflective surface 124 which, as shown in FIGS. 2 and 3B, is placed in back of (behind) and opposite the card 12. The light, from light sources 122, incident on the white surface 124 is reflected back towards panel 130 and light passes through the window 102 towards the back of the card. The reflected light tends to be uniform ensuring that a uniform wall of light hits the random marks (e.g., holes) formed in region 100 of card 12. This type of indirect lighting is a significantly superior way of illuminating the marks (e.g., holes) uniformly as compared to the prior art method of shining a light source directly onto the back side of the card. Where region 100 includes a hologram or metal strip in which random holes are formed and where region 100 covers window 102, the backside illumination, i.e. thru the card, provides a condition where the illumination simply leaks through the tiny holes in the region 100 and the light pattern, corresponding to the randomly formed holes, is then captured by the optical sensing equipment facing the front surface of the card 12. In the embodiment shown in FIG. 2, the non-holed portion of the metallization strip (or hologram) 101 acts a shield to block the light coming from the backside of the card, except where holes are present in the region 100.

Figure 7A:
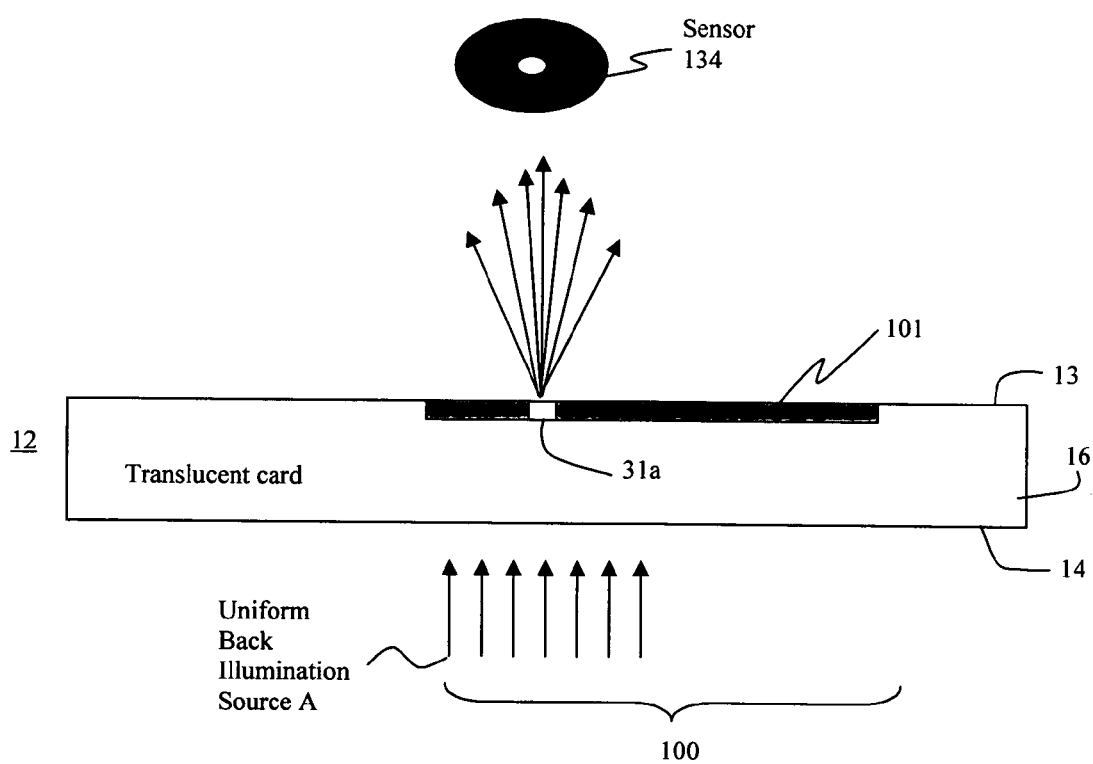
FIGS. 7A and 7B illustrate the light signals produced by different marks and cards in a "back illumination" reader/writer embodying the invention.
Figure 7B:
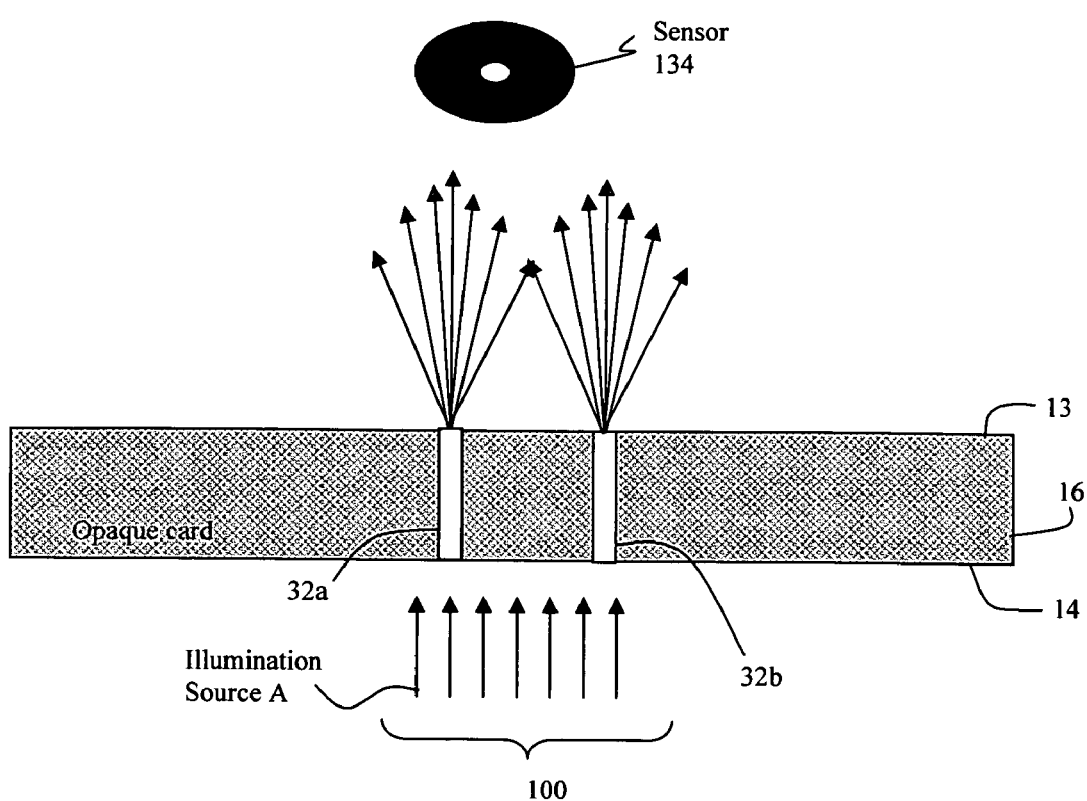

To provide a brighter and more uniform array of light reflected back onto the card 12, a highly reflective surface (e.g., a mirror) 136 is located behind the diffusive surface 124. The highly reflective surface 136 functions to reflect back any light passing through the surface 124 to further aid in generating a uniform array of light incident on the back plane of card 12. Light incident onto the back surface of the card 12 will pass through the "random" holes in the card as shown in FIGS. 7A and 7B. The remainder of the card blocks light from coming through so that any illumination will only leak through the randomly placed holes in the region 100 of the card 12.

In FIG. 2, a mirror 132 is positioned in front of the card 12, opposite region 100, and the light hitting the mirror 132 is then directed onto an array (area) sensor 134. The area sensor is coupled to a signal processor 138 which can determine the number and location of the light spots corresponding to the holes in the holographic pattern. The signal processor is coupled to an encoder 140 which may be used to encode the detected light pattern onto a storage area located on the card and or to transmit the information to an off-card storage element (not shown).

FIGS. 3A, 3B and 3C, illustrate in greater detail, the placement of the light sources in the reader. FIG. 3A, which is a bottom or back view, shows a plate 130 with a cut-out or window 102 and with the placement of light emitting diodes (LEDs) 122a-122h around the periphery of the opening 102. The location of opening 102 is designed to line up with the location of the area 100 on the card 12, when the card is inserted into the reader 10. So designed, the light emitted by light sources 122 incident on reflective surface 124 and then reflected from reflective surface 124 will uniformly illuminate the "back" of the card 12, pass through the randomly formed holes in the card, and a pattern corresponding to the randomly formed holes will then be formed on and within an area image sensor 134 either directly or via a mirror, as shown in FIG. 2.

The backside illumination, i.e. thru the card, provides a situation where the illumination simply leaks through the tiny holes in the holographic pattern and this is then captured by the optical sensing equipment and then the hologram acts a shield to block the light coming from the backside of the card. A simulation of the captured picture is shown in FIG. 1C with the hologram and six randomly placed holes. The randomly placed holes are typically less than 100 microns in diameter. The holes are therefore difficult to be seen by the naked eye. The uniform array of light facilitates the sensing of these extremely tiny holes. The random pattern is detected by the optical area sensor that detects the light leaking through the holes in the holographic foil. Note that plate 13O is connected to upper and lower horizontal arms 125a and 125b across which diffusive surface 124 and mirror 136 are mounted. These components define a light enclosure for processing the light produced by the LEDs mounted on plate 130.

FIG. 4, shows a novel reader arrangement for reading/sensing the random hole pattern by illuminating the front of the card. In this system, a light source 222, which may be an LED, emits a ray of light, onto the card 12, at an angle alpha ($\alpha$) relative to the surface of the card 12. In FIG. 4, the region 100 to be illuminated by the light source 222 is a hologram or a highly reflective metal strip. The LED's illumination is directed at an angle alpha ($\alpha$) onto the highly reflective region 100 in which are located the randomly formed holes. The light (e.g., L1) incident on a portion of the surface which has no holes is reflected from the highly reflective surface at an angle equal to 180 degrees minus the incident angle ($\alpha$). However, the light (e.g., L2) incident on holes in the region 100 will be reflected at a multiplicity of angles.

FIG. 4 shows that if the optical sensor (e.g., the mirror 232 and the area sensor) is placed at a position that is beyond or outside a region defined as 180 degree minus the incident angle ($\alpha$), then all the illumination that strikes the holographic foil will miss the optical sensor and appear as an optically black image to the sensor. And, the light reflected from the holes will be sensed by the optical sensor and appear as illumination points.

In FIGS. 2 and 4, mirrors 132 and 232, respectively, are shown mounted in front of the card to collect the light signals and to then redirect the light to an array sensor 134. The mirrors could be eliminated and senor arrays could be positioned to directly sense the light coming through the card or reflected off the surface of a card. However, using mirrors enables the reader to be made more compact.

Figure 6A:
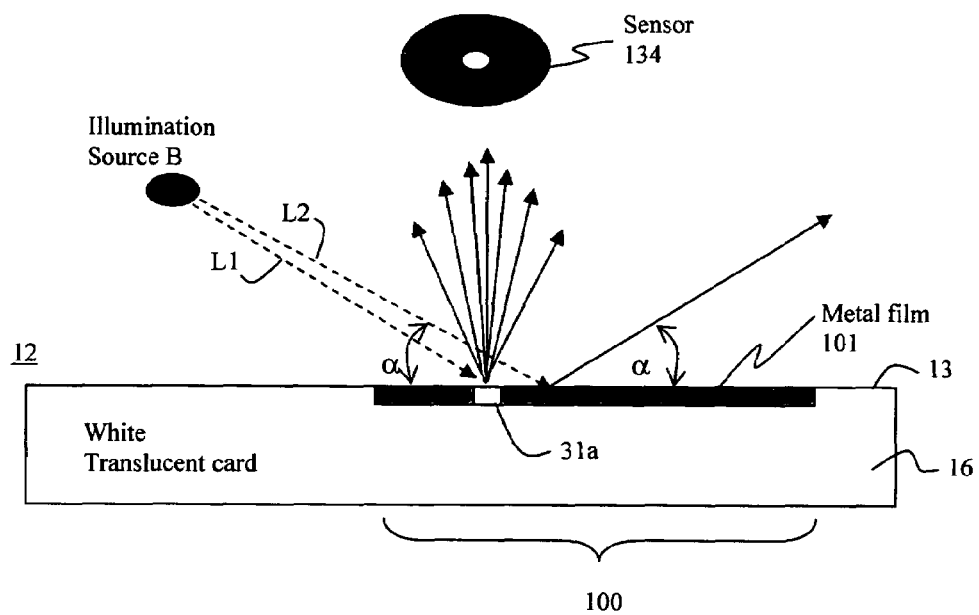
FIGS. 6A, 6B and 6C illustrate the light signals produced by different marks and cards in a "front illumination" reader/writer embodying the invention.

FIG. 6A illustrates the front illumination of a card 12, of the type shown in FIG. 5A, having partial-holes 31a-31c randomly formed in a metal strip 101 disposed on the top surface 13 of the card. For this embodiment, the light is projected onto the area 100 of the card at an acute angle alpha relative to the plane of the card surface. A light beam L1 incident on a hole 31a will be reflected from the hole 31a in multiple directions and will be captured (sensed) by array sensor 134 positioned in front of region 100 of the card. A light beam L2 incident on the highly reflective portion of the metal strip 101 will be reflected (bounce-off) at an angle of 180 degrees minus alpha and will not be sensed by the sensor 134. The ensuing pattern sensed by the sensor will have an appearance of the type shown in FIG. 1C; i.e., a black background with white dots.

Figure 6B:
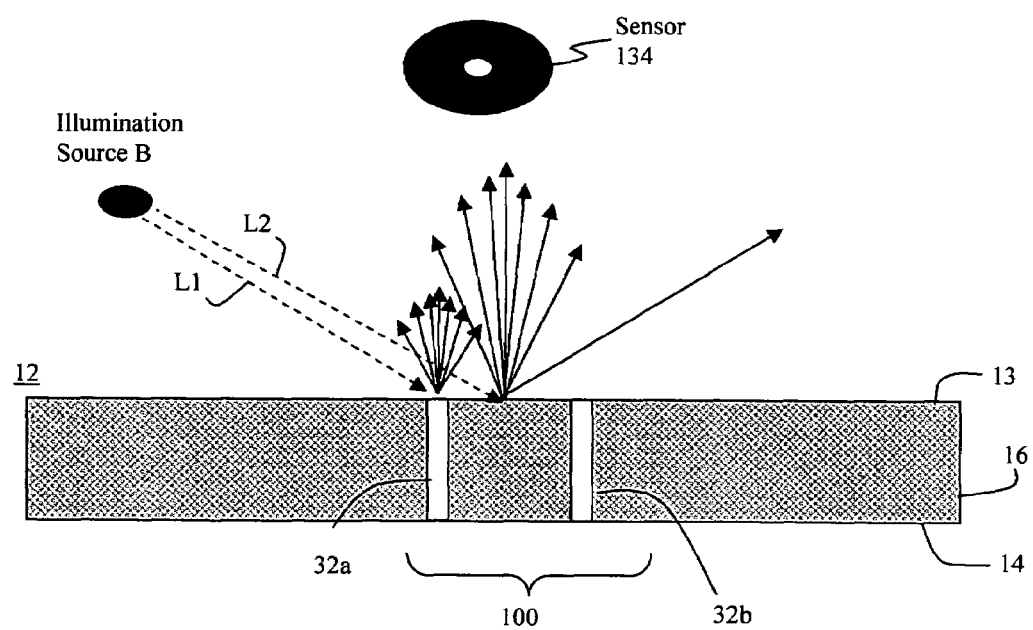

FIG. 6B illustrates the front illumination of a card 12, of the type shown in FIG. 5C, having thru-holes 32a, 32b randomly formed between the top surface 13 and the bottom surface 14 of the card in a region 100. In FIG. 6B the substrate or body 16 of card 12 is made of an opaque white material and light is projected onto the area 100 of the card at an acute angle alpha relative to the plane of the card surface. A light beam L1 incident on a hole 32a (or 32b) will be reflected from the hole 32a in all directions and will be captured (sensed) by array sensor 134 positioned in front of region 100 of the card. Light beam L2 incident on the surface of the white card body will also be reflected in all directions. However, the amplitude of the light reflected from the non-hole portion of the surface will be different (e.g., greater) than the amplitude of the light reflected from the illuminated holes. The ensuing pattern sensed by the sensor 134 will have an appearance of the type shown in FIG. 1D; i.e., a white background with grey or black dots.

Figure 6C:
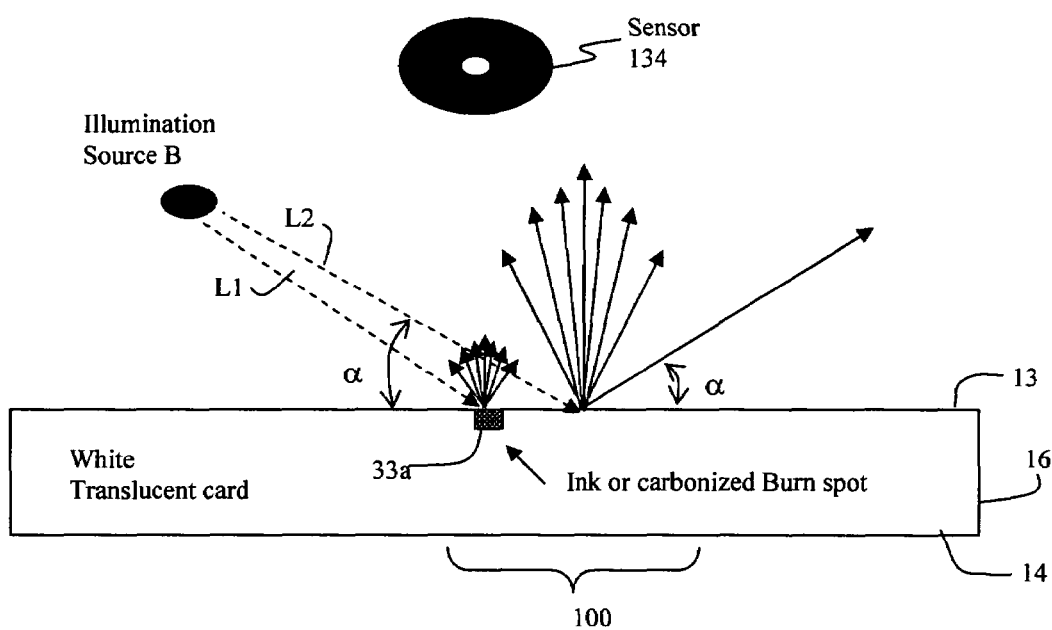

FIG. 6C illustrates the front illumination of a card 12, of the type shown in FIG. 5B, having ink or burn spots 33a randomly formed in the top surface 13 of the card. In FIG. 6C the substrate 16 of the card is white and light is projected onto the area 100 of the card at an acute angle alpha relative to the plane of the card surface. A light beam L1 incident on mark 33a (and any other mark) will be reflected at a lower amplitude than a light beam L2 incident on the non-hole portion of the surface. An image (array) sensor 134 positioned in front of region 100 of the card can then be calibrated to sense the presence or absence of the spots. For the embodiment shown in FIG. 6C, the ensuing pattern sensed by the sensor will have an appearance of the type shown in FIG. 1D; i.e., a white background with black dots.

If random ink marks of different colors are formed on the card, an additional level of security is obtained by reading them with different light sources and/or filters and then encoding that information on the card. The reader can read the cards with a multi-spectrum light source (white light) and a color sensor.

FIG. 7A illustrates the back illumination of a card 12 having partial-holes 31a randomly formed in a metal strip 101 disposed on the top surface 13 of the card. For this embodiment, uniform illumination is produced as shown, for example, in FIGS. 2, 3A, 3B and 3C and the light is projected onto the underside (or back) of area 100 of the card. The holes 31a allow light to pass through and to be sensed by area sensor 134. Light hitting the underside of the metal strip 101 will be reflected back and not pass through. The ensuing pattern sensed by the sensor will have an appearance of the type shown in FIG. 1C; i.e., a black background with white dots.

FIG. 7B illustrates the back illumination of a card 12 having thru-holes 32a, 32b randomly formed between the top surface 13 and the bottom surface 14 of the card in a region 100. In FIG. 7B the substrate or body 16 of card 12 is made of an opaque (non-transmissive) material. For this embodiment, uniform illumination is projected onto the back of the card corresponding to area 100 of the card. The holes 32a, 32b, allow light to pass through and to be sensed by area sensor 134. Light hitting the underside of the card where no holes are present will be reflected back and not pass through. The ensuing pattern sensed by the sensor will have an appearance of the type shown in FIG. 1C; i.e., a black background with white dots.

FIG. 8 illustrates various process steps in forming cards embodying the invention. These include:
1—assembling the card material,
2—laminating
  a. the card made of plastic material,
  b. placing RFID chip and antenna on card,
  c. putting a layer of metallization on, or in, selected areas and adding a protective coat
3—form random patterns in metallized area or in selected area
4—send card to programming facility
5—detect random pattern and encode pattern into storage element (e.g., RFID chip)
6—send encoded card to personalization facility
7—complete final personalization; and
8—issue card to card holder for use.

For the card user to make effective use of the card, it must be authenticated by means of a reader of the type discussed above.

What is claimed is:

1. An instrument with increased security features comprising:
   generally parallel top and bottom surfaces defining a space therebetween and four sides around the edge of the instrument; and
   a dedicated area located on one of the top and bottom surfaces of the instrument; said dedicated area occupying an area which is typically less than 20% of the surface area of the surface on which said dedicated area is located;
   randomly formed marks formed within the dedicated area and defining a random pattern formed within the dedicated area, whereby a pattern is formed within the instrument which is intended to be different than the pattern formed on any other instrument; and
   wherein the random pattern is characterized in that, when subjected to a light signal, the random pattern produces an optical pattern indicative of the random pattern.

2. An instrument as claimed in claim 1 wherein said dedicated area includes a highly reflective region and wherein the random pattern is formed within the highly reflective area.

3. An instrument as claimed in claim 2 wherein said highly reflective region is one of a hologram and a metalized film.

4. An instrument as claimed in claim 2 wherein the instrument includes a data storage element and wherein data indicative of the random pattern is encoded into the data storage element.

5. An instrument as claimed in claim 4 wherein said information storage element is one of a magnetic stripe, a bar code, and a semiconductor circuit.

6. An instrument as claimed in claim 4, wherein said randomly formed marks include one of the following: (a) partial through holes extending from one of said top and bottom surfaces; (b) through holes extending the full height of the instrument from the top surface to the bottom surface; (c) ink marks; and (d) burn marks.

7. An instrument as claimed in claim 6, wherein (a) the partial through holes extending from one of said top and bottom surfaces are less than 100 microns in diameter; (b) the through holes extending the full height of the instrument from the top surface to the bottom surface are less than 100 microns in diameter; (c) the ink marks and the burn marks are less than 100 microns along their longest dimension.

8. An instrument as claimed in claim 6, wherein, after the pattern is formed on the instrument, the instrument is read optically by illuminating at least one of the top and bottom surfaces of the instrument to produce signals corresponding to the random pattern; which signals are then encoded in an information storage element on the instrument; and wherein the instrument is subsequently authenticated by optically illuminating the instrument, sensing the signals produced by the optical illumination and then comparing the signals produced with the signals encoded in the information storage element.

9. An instrument as claimed in claim 6, wherein the top and bottom surfaces of the instrument and the space between the top and bottom surfaces are selected to enable light incident on at least one of the top or bottom surface to produce optical signals corresponding to the number and location of the randomly formed marks; wherein the optical signals corresponding to the random pattern are sensed and are encoded onto a data storage element on the instrument; wherein the instrument also includes an antenna coupled to the data storage element for providing radio frequency communication with a receiver located remotely from the instrument; and wherein the instrument is authenticated by illuminating the random pattern and obtaining optical signals and then comparing the optical signals with those previously encoded on the instrument.

10. The instrument as claimed in claim 9 wherein the space between the top and bottom surface is one of: (a) opaque and (b) translucent.

11. An instrument as claimed in claim 2 further including an information storage element on the instrument, and wherein the instrument, when formed, is illuminated to generate a signal pattern corresponding to the random pattern formed in the dedicated area; and wherein the signal pattern is sensed and information corresponding thereto is encoded in the information storage element to enable the card to be validated at a future time.

12. A method of making a card, having generally parallel top and bottom surfaces defining a space therebetween and four sides around the edge of the card, with increased security features comprising the steps of:
    defining a particular location on one of the top and bottom surfaces of the instrument; said particular location occupying an area which is typically less than 20% of the surface area of the surface on which said dedicated area is located;
    forming random marks within the particular area whereby a random pattern is formed within the instrument which is intended to be different than the pattern formed on any other instrument; and
    wherein the random pattern is characterized in that, when subjected to a light signal, the random pattern produces an optical pattern indicative of the random pattern.

13. A method of forming a card as claimed in claim 12, wherein the dedicated area includes a highly reflective region formed on the top surface of the card; and wherein said randomly formed marks include one of the following: (a) partial through holes extending from the top surface; (b) through holes extending from the top surface to the bottom surface of the card; (c) ink marks; and (d) burn marks.

14. A method of forming a card as claimed in claim 13, wherein the highly reflective region is one of a hologram and a metal film; and wherein (a) the partial through holes extending from the top surface are less than 100 microns in diameter; (b) the through holes extending from the top surface to the bottom surface are less than 100 microns in diameter; (c) the ink marks and the burn marks are shaped such that they are less than 100 microns along their longest direction.

15. A method of forming a card as claimed in claim 13, wherein the space between the top and bottom surfaces of the card is comprised of one of a translucent and opaque material, and including the steps of illuminating the card to obtain optical signals corresponding to the random pattern and encoding the corresponding signal information onto a data storage element located on the card.

16. A system for impeding the counterfeiting of an instrument comprising:
    said instrument having front and back surfaces and a dedicated region on the front surface in which optical marks are formed randomly; where said randomly formed marks include one of the following: (a) partial through holes extending from the front of the instrument which are less than 100 microns in diameter; (b) through holes extending from the front surface to the back surface which are less than 100 microns in diameter; (c) ink marks; and (d) burn marks; wherein the ink marks and the burn marks are shaped such that they are less than 100 microns along their longest direction;
    said instrument also including a data storage element for storing information to be read by a reading device;
    means for illuminating the dedicated region containing the random pattern for generating signals corresponding to the random pattern, and encoding data corresponding thereto within said data storage element; and
    means for subsequently illuminating the random pattern and optically sensing the correspondingly generated optical signals produced and for reading the corresponding encoded data within the data storage element to validate the instrument.

17. A system as claimed in claim 16, wherein the system includes a reader having means for indirectly illuminating the back of the card; and wherein the means for indirectly illuminating the back surface of the card includes light sources directed at a white reflective surface and said white reflective surface being positioned opposite the back surface of the card for producing relatively uniform lighting incident on the back surface of the card.

18. A system as claimed in claim 17, wherein the system includes a reader having means for projecting a beam of light incident onto the card at an acute angle relative to the plane of the card; and wherein light incident on the random marks is reflected to produce different amplitude signals depending on whether the light is incident on a mark formed on the surface or the top surface where no mark is present.

19. A system as claimed in claim 18, wherein the means for projecting a beam of light includes means for directly illuminating the front of the card, and wherein an optical sensor facing the front surface of the card is positioned to capture the light reflected from the card where a mark is present on the top surface of the card and wherein the light reflected from the top surface of the card where no mark is present is not captured by the optical sensor.

20. A light enclosure comprising:
    a first plate having a front surface and a back surface;
    a second plate having a front surface arranged to be generally parallel to the back surface of the first plate and at a distance "d" therefrom; the second plate formed of a white light reflective and light diffusing material;
    a light source mounted on the back surface of the first plate; the light from the light source being directed to the front surface of the second plate for producing an array of relatively uniform light reflected from the front surface of the second plate towards the back surface of the first plate.

21. The light enclosure as claimed in claim 20 wherein the first plate includes a window which is cut out to define a particular region on the first plate; wherein the light source is mounted in close proximity to the edges of the window; and further including means for mounting a card having a top and bottom surface such that the bottom surface of the card faces the front surface of the first plate whereby light incident on the first plate can pass through the window and impinge on the bottom surface of the card.

22. The light enclosure as claimed in claim 21 further including a highly reflective plate positioned to face the back surface of the second plate for reflecting light passing through the second plate back through the second plate toward the first plate.

23. The light enclosure as claimed in claim 22 wherein the first and second plates are coupled to each other within a reader for enabling a card to be positioned opposite the window of the first plate for providing illumination to the surface of the card facing the window.

24. The light enclosure as claimed in claim 22 wherein the first, second and reflective plates are coupled to each other for providing illumination for the surface of a card facing the window.

25. The light enclosure as claimed in claim 21 wherein multiple light sources are mounted around the periphery of the window of the first plate with their lights directed at the front surface of the second plate for producing an indirect relatively uniform light source across the window of the first plate for illuminating the surface of a card positioned opposite the front surface of the first plate.

26. The light enclosure as claimed in claim 21 further including means for illuminating the top surface of the card at an acute angle relative to the plane of the card; and optical sensing means for selectively sensing light passing from the bottom to the top of the card and light reflected from the surface of the top of the card other than light reflected in a range of 180 degrees to 180 degrees minus the acute angle at which the top surface is illuminated.

27. A combination comprising:
means for holding a card having a front surface and a back surface and said card having a dedicated region within said front surface in which marks are randomly formed;
a source of light for illuminating the front surface of the card at an acute angle relative to the plane of the card whereby; (a) light incident on the front card at an acute angle is reflected from the card at an angle of 180 degrees minus the acute angle of the incident light; except for light incident on the marks; and (b) light incident on the marks is reflected in multiple directions from the surface of the card; and
optical sensing means mounted opposite the front surface of the card for sensing the signals reflected from the marks.

28. The combination as claimed in claim 27 wherein the optical sensing means includes an area sensor.

29. The combination as claimed in claim 27 wherein the optical sensing means includes an area sensor and a mirror.

30. The combination as claimed in claim 27 wherein the marks on the cards include: (a) partial through holes extending from the front of the card; (b) through holes extending from the top surface to the bottom surface of the card; (c) ink marks; and (d) burn marks.

31. The combination as claimed in claim 30 wherein the random marks formed on the card are formed by one of etching and laser scribing selected portions of the card.

32. A system for impeding the counterfeiting of a card comprising:
a card having a front surface with a highly reflective region with random optical marks formed on said highly reflective region of said front surface for generating an optical pattern corresponding to said random optical marks when the card is illuminated; said card including a data storage element;
means for illuminating said highly reflective region for generating optical signals corresponding to the pattern formed by said random marks;
said card also having a back surface;
means for illuminating the back surface of the card for generating optical signals corresponding to the pattern formed on the card;
means positioned in front of the front surface of the card for optically sensing the optical signals and encoding the data storage element with information corresponding to the sensed optical signals; and
means for authenticating the card including means for illuminating said highly reflective region for sensing the pattern produced by said random marks and for comparing the sensed pattern versus the pattern encoded in said data storage element.

* * * * *